US012771061B2

(12) United States Patent
Takeuchi et al.

(10) Patent No.: US 12,771,061 B2
(45) Date of Patent: Oct. 20, 2026

(54) CONFIGURABLE CABLE GROMMET HAVING A TAPERED BORE

(71) Applicant: Go!Foton Holdings, Inc., Somerset, NJ (US)

(72) Inventors: Kenichiro Takeuchi, North Brunswick, NJ (US); David Zhi Chen, Dallas, TX (US)

(73) Assignee: Go!Foton Holdings, Inc., Somerset, NJ (US)

(*) Notice: Subject to any disclaimer, the term of this patent is extended or adjusted under 35 U.S.C. 154(b) by 542 days.

(21) Appl. No.: 18/216,786

(22) Filed: Jun. 30, 2023

(65) Prior Publication Data

US 2025/0007206 A1 Jan. 2, 2025

(51) Int. Cl.
*H01R 13/52* (2006.01)

(52) U.S. Cl.
CPC ..... *H01R 13/5208* (2013.01); *H01R 13/5221* (2013.01)

(58) Field of Classification Search
CPC ............ H01R 13/5208; H01R 13/5221; H01R 13/5205; H02G 15/013; G02B 6/44775
See application file for complete search history.

(56) References Cited

U.S. PATENT DOCUMENTS 6,957,817 B2 * 10/2005 Goll .......................... F16L 5/08 277/606
11,469,544 B2 * 10/2022 Liu .................... H01R 13/5221

FOREIGN PATENT DOCUMENTS

GB 2391721 A * 2/2004 ............... F16J 3/045

* cited by examiner

*Primary Examiner* — Abdullah A Riyami
(74) *Attorney, Agent, or Firm* — Lerner David LLP

(57) ABSTRACT

Cable grommets and related technology providing an optimized combination of ease-of-use and component protection when used in multi-cable terminals. A configurable cable grommet may be tailored to a cable and then placed on the cable to ensure watertight connection between the cable and a cable seal in which the cable is placed. The cable seal may be part of a multi-terminal enclosure, and thus when the cable with grommet is placed in the seal the grommet ensures that water or other elements do not get inside the terminal by getting through space between the cable seal and the cable.

12 Claims, 9 Drawing Sheets

CONFIGURABLE CABLE GROMMET HAVING A TAPERED BORE

BACKGROUND

The increasing deployment of electronic and fiber optic networks has given rise to an increasing need to manage the distribution of signals in such networks. Often, the distribution of signals is managed through the routing of cables associated with the signals and involves the use of multi-cable terminals that allow for selective connection between cables at designated points in a network.

The increasing need to manage signal distribution is particularly acute with respect to fiber optic communications. For example, fiber optic communication signals between individual homes and a fiber network may be implemented through an Outside Plant (OSP) terminal, such as a drop box. In such a system, the terminal may couple a high capacity main cable to a multiple of lower capacity cables so that communication signals for each home may be delivered via a corresponding low capacity dedicated cable. In this manner, there is no need to run a high capacity cable to each home. Moreover, the terminal may be constructed so as to allow cables to be easily connected to the terminal and easily disconnected from the terminal, as dictated by circumstance. For instance, if a home's dedicated cable is damaged the damaged cable may be readily disconnected from the terminal and replaced with a new cable.

BRIEF SUMMARY

In creating the technology described in this disclosure, it was recognized that a desirable feature of multi-cable terminals is an optimized combination of ease-of-use and component protection. Such optimization is among the advantages of the technology. One of the features of the present technology is a configurable cable grommet that may be tailored to a cable and then placed on the cable to ensure watertight connection between the cable and a cable seal in which the cable is placed. Moreover, the cable seal may be part of a multi-cable terminal enclosure, and thus when the cable with grommet is placed in the seal the grommet ensures that water or other elements do not get inside the terminal by getting through any space between the cable seal and the cable.

In accordance with an aspect of the technology described in this disclosure, a cable grommet includes a body having an outer surface, a first end, a second end, and a longitudinal axis extending between the first end and the second end; and a bore extending along the longitudinal axis of the body between the first end and the second end, wherein the outer surface of the body is cylindrical and has an outer surface diameter that is constant or substantially constant as the body is traversed from the first end to the second end, and wherein the bore has a bore diameter that tapers as the bore is traversed from the first end to the second end.

In accordance with another aspect of the technology described in this disclosure, a method for configuring a cable grommet for a cable includes providing a configurable cable grommet, the configurable cable grommet comprising a body having an outer surface, a first end, a second end, and a longitudinal axis extending between the first end and the second end, a bore extending along the longitudinal axis of the body between the first end and the second end, and a slit that extends from the outer surface of the body to the bore, and from the first end of the body to the second end of the body, wherein the outer surface of the body is cylindrical and has an outer surface diameter that is constant or substantially constant as the body is traversed from the first end to the second end, and wherein the bore has a bore diameter that tapers as the bore is traversed from the first end to the second end; placing the configurable cable grommet around a cable; noting a transition point where the slit transitions from an open slit disposition to a closed slit disposition; determining one or more separating positions based on the transition point; and separating the configurable cable grommet at the one or more separating positions to form a configured cable grommet.

BRIEF DESCRIPTION OF THE DRAWINGS

The accompanying drawings are not intended to be drawn to scale. Also, for purposes of clarity not every component may be labeled in every drawing.

DETAILED DESCRIPTION

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1B:
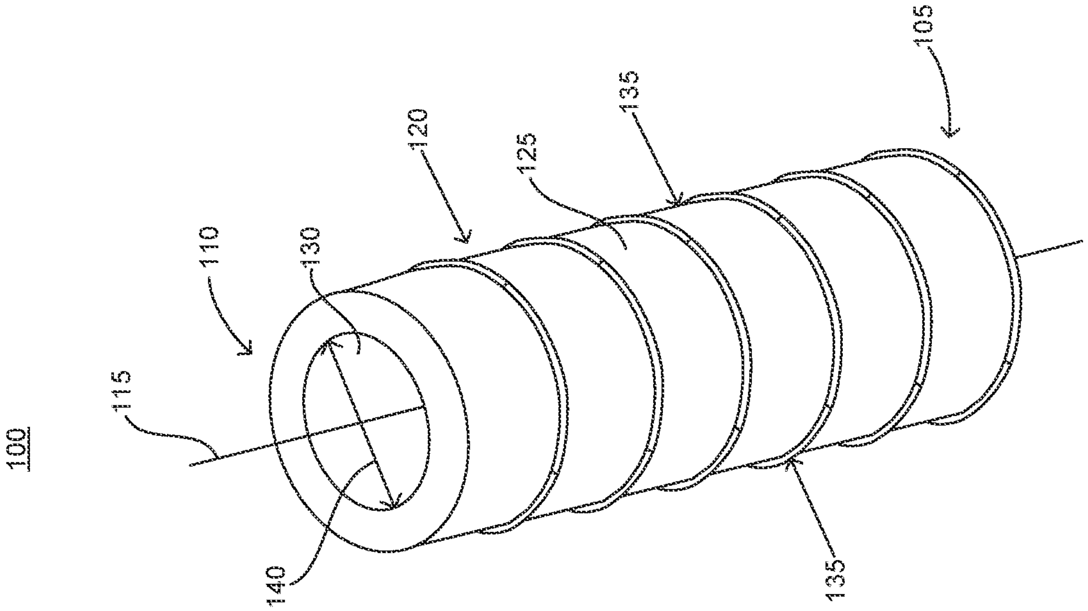
FIG. 1B is a perspective view of the cable grommet of FIG. 1A, as seen with a second end of the cable grommet facing the viewer.
Figure 1A:
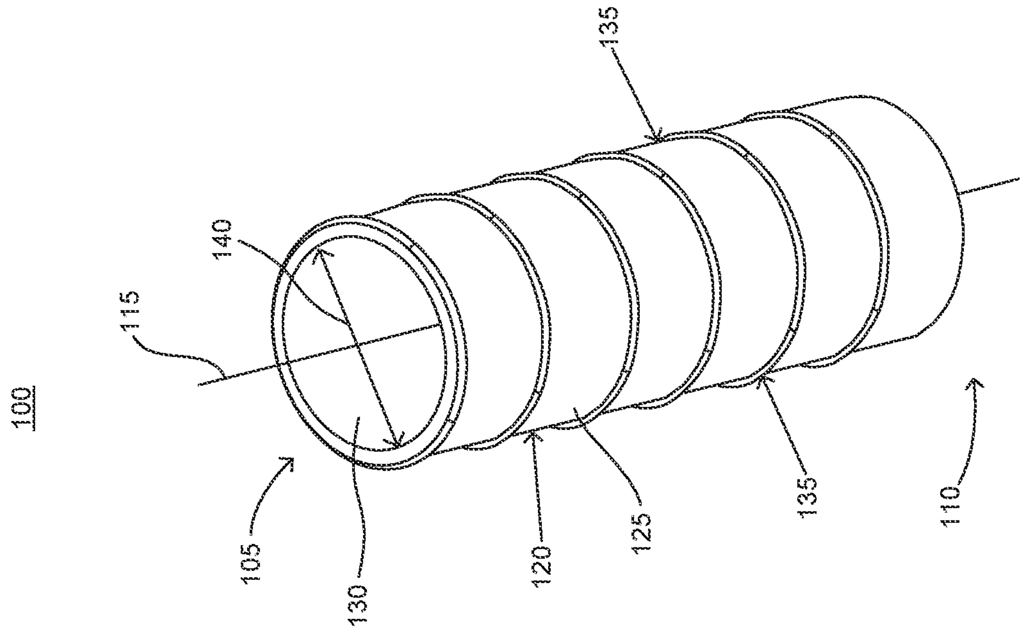
FIG. 1A is a perspective view of a cable grommet, as seen with a first end of the cable grommet facing the viewer.

FIG. 1A is a perspective view of a cable grommet 100, as seen with a first end 105 of the cable grommet 100 facing the viewer. The cable grommet 100 has a second end 110, which faces away from the viewer in FIG. 1A. FIG. 1B is a perspective view of the cable grommet 100 of FIG. 1A, as seen with the second end 110 of the cable grommet 100 facing the viewer. As can be seen from FIGS. 1A and 1B, the cable grommet 100 has a longitudinal axis, represented by line 115, extending between the first end 105 and the second end 110, a body 120 having an outer surface 125 and extending along the longitudinal axis 115, and a bore 130 extending along the longitudinal axis 115. The outer surface 125 of the body 120 is cylindrical and has an outer surface diameter 135 that is constant or substantially constant as the body 120 is traversed from the first end 105 to the second end 110. The bore 130 has a bore diameter 140 that tapers as the bore 130 is traversed from the first end 105 to the second end 110.

Figure 1D:
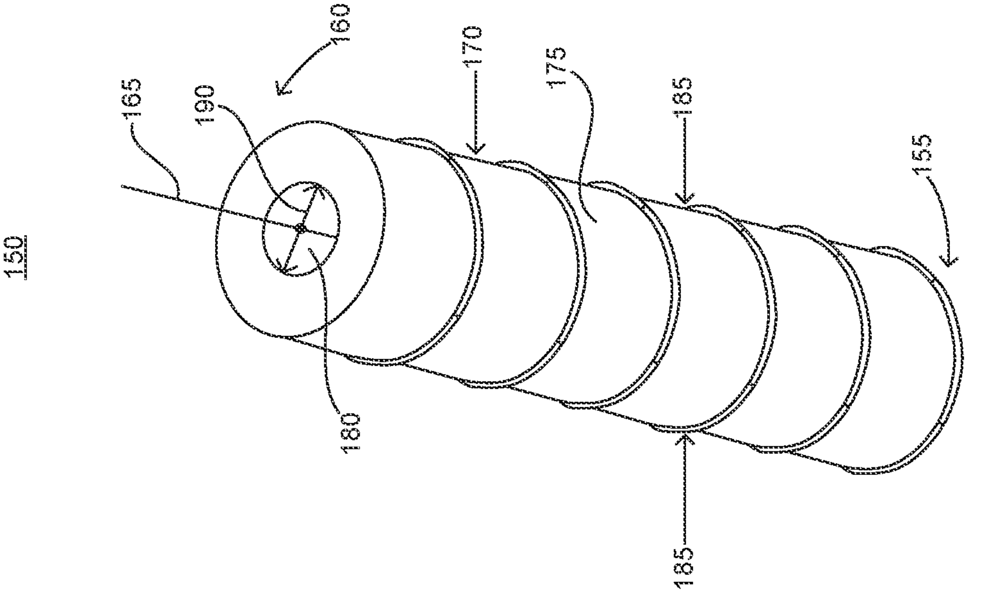
FIG. 1D is a perspective view of the cable grommet of FIG. 1C, as seen with a second end of the cable grommet facing the viewer.
Figure 1C:
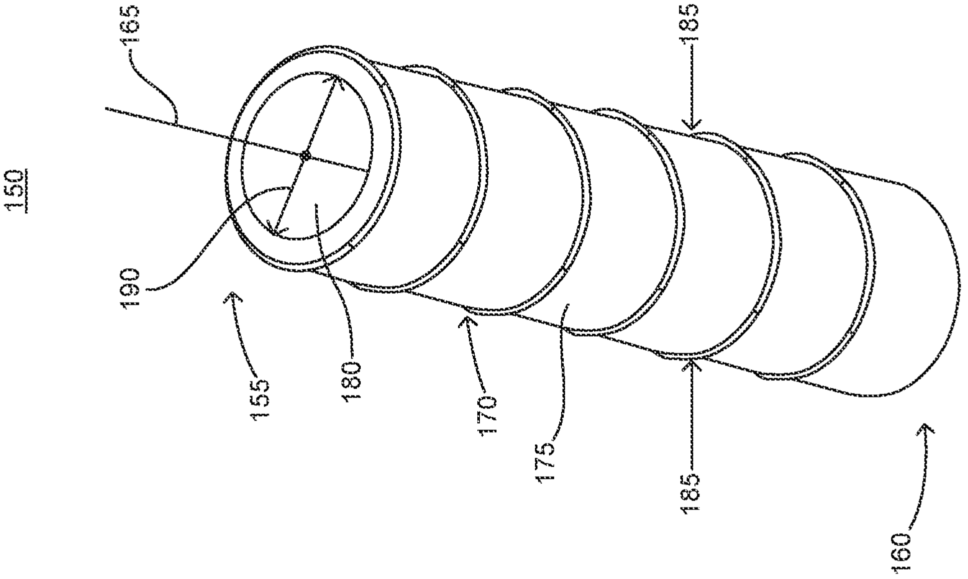
FIG. 1C is a perspective view of another cable grommet, as seen with a first end of the cable grommet facing the viewer, the dimensions of the FIG. 1C cable grommet being smaller than the dimensions of the cable grommet of FIGS. 1A and 1B.

FIG. 1C is a perspective view of another cable grommet 150, as seen with a first end 155 of the cable grommet 150 facing the viewer. The cable grommet 150 has a second end 160, which faces away from the viewer in FIG. 1C. FIG. 1D is a perspective view of the cable grommet 150 of FIG. 1C, as seen with the second end 160 of the cable grommet 150 facing the viewer. FIGS. 1C and 1D are drawn to the same scale as FIGS. 1A and 1B. As can be seen from a comparison of FIGS. 1A, 1B, 1C, and 1D, the cable grommet 150 of FIGS. 1C and 1D is similar to the cable grommet 100 of FIGS. 1A and 1B, but with dimensions that are smaller than the dimensions of the cable grommet 100 of FIGS. 1A and 1B. The difference in dimensions may arise from different intended applications for cable grommet 100 and cable grommet 150. For example, cable grommet 100 may be intended for use with terminal feeder cables, whereas cable grommet 150 may be intended for use with terminal branch cables.

In any event, the cable grommet 150 has a longitudinal axis, represented by line 165, extending between the first end 155 and the second end 160, a body 170 having an outer surface 175 and extending along the longitudinal axis 165, and a bore 180 extending along the longitudinal axis 165. The outer surface 175 of the body 170 is cylindrical and has an outer surface diameter 185 that is constant or substantially constant as the body 170 is traversed from the first end 155 to the second end 160. The bore 180 has a bore diameter 190 that tapers as the bore 180 is traversed from the first end 155 to the second end 160.

Figure 2A:
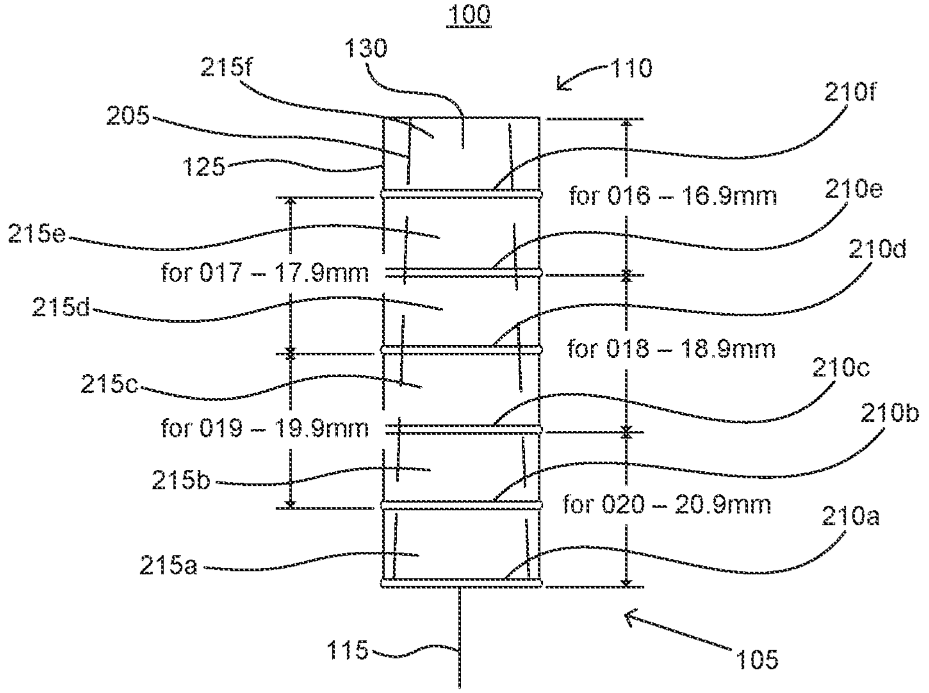
FIG. 2A is a plan view the cable grommet of FIGS. 1A and 1B including a phantom depiction of a longitudinal cross-section of the grommet bore.
Figure 2B:
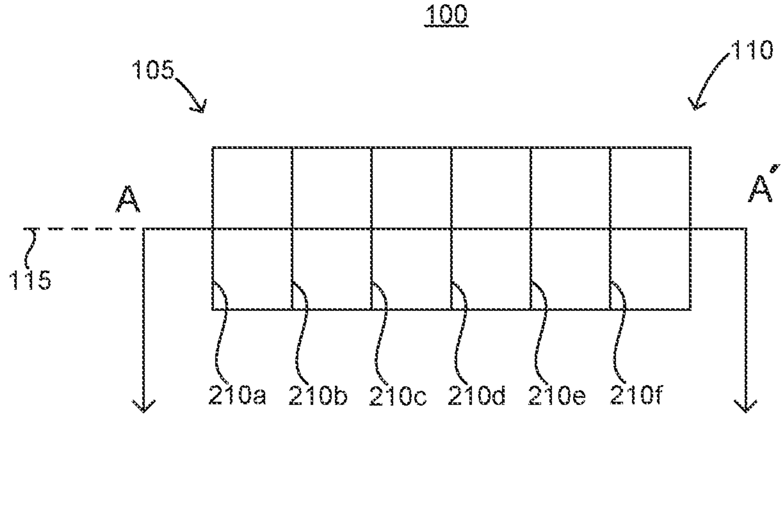
FIG. 2B is a side view of the cable grommet of FIG. 2A, showing the position of the longitudinal cross-section depicted in phantom in FIG. 2A.

FIG. 2A is a plan view the cable grommet 100 of FIGS. 1A and 1B including a phantom depiction 205 of a longitudinal cross-section of the grommet bore 130. The phantom depiction 205 represents the appearance of the grommet bore 130 as seen in a longitudinal cross-section of the cable grommet 100, which is illustrated in FIG. 2B as cross-section AA'. FIG. 2A is provided as an example plan view of a cable grommet embodiment having a cylindrical outer surface with constant diameter and a tapered bore. Other cable grommet embodiments may have similar plan views, although with different dimensions.

As can be further seen from FIG. 2A, the cable grommet 100 includes protrusions in the form of protrusion rings 210*a*-210*f*. The protrusion rings 210*a*-210*f* (collectively protrusion rings 210) are evenly spaced along the longitudinal axis 115, each extend along the circumference of the outer surface 125, and are used to indicate positions along the longitudinal axis 115. As such, the protrusion rings 210 demarcate grommet sections 215*a*-215*f* of the cable grommet 100. The grommet sections 215*a*-215*f* (collectively grommet sections 215) proceed in sequence from the first end 105 of the cable grommet 100 to the second end of the cable grommet 110 such that grommet section 215*a* is closest to the first end 105 and section 215*f* is closest to the second end 110. Accordingly, the grommet sections 215 correspond to the bore 130 such that the bore diameter 140 at the section midpoints decreases from section-to-section when proceeding along the cable grommet 100 from grommet section 215*a* to 215*f*. In this manner, different grommet sections 215, or diverse groups of the grommet sections 215, may be designated for application to different cable sizes. By way of example, FIG. 2A illustrates ranges of cable sizes for respective pairs of the grommet sections 215. More specifically, FIG. 2A illustrates that cable sections 215*a* and 215*b* may be used for cables having diameters in the range of 20.0 mm to 20.9 mm; cable sections 215*b* and 215*c* may be used for cables having diameters in the range of 19.0 mm to 19.9 mm; cable sections 215*c* and 215*d* may be used for cables having diameters in the range of 18.0 mm to 18.9 mm; cable sections 215*d* and 215*e* may be used for cables having diameters in the range of 17.0 mm to 17.9 mm; and cable sections 215*e* and 215*f* may be used for cables having diameters in the range of 16.0 mm to 16.9 mm.

It should be noted that demarcation of the grommet sections 215 is not restricted to the use of protrusion rings 210. For instance, indentations (e.g., indentation rings), dashed slits (e.g., dashed slit rings), or other markings (e.g., printed markings) may be used to demarcate the grommet sections 215. Moreover, a combination of markings and protrusions, markings and indentions, or markings and dashed slits, may be used to demarcate the grommet sections 215. Still further, the cable grommet 100 may include one or more of protrusions, indentations, dashed slits, or markings to indicate positions along the longitudinal axis 115 without being evenly spaced along the longitudinal axis 115, and/or without demarcating sections of the cable grommet 100. Upon review of this disclosure, one can readily appreciate the wide variety of indications that may be provided on the cable grommet 100.

Figure 2C:
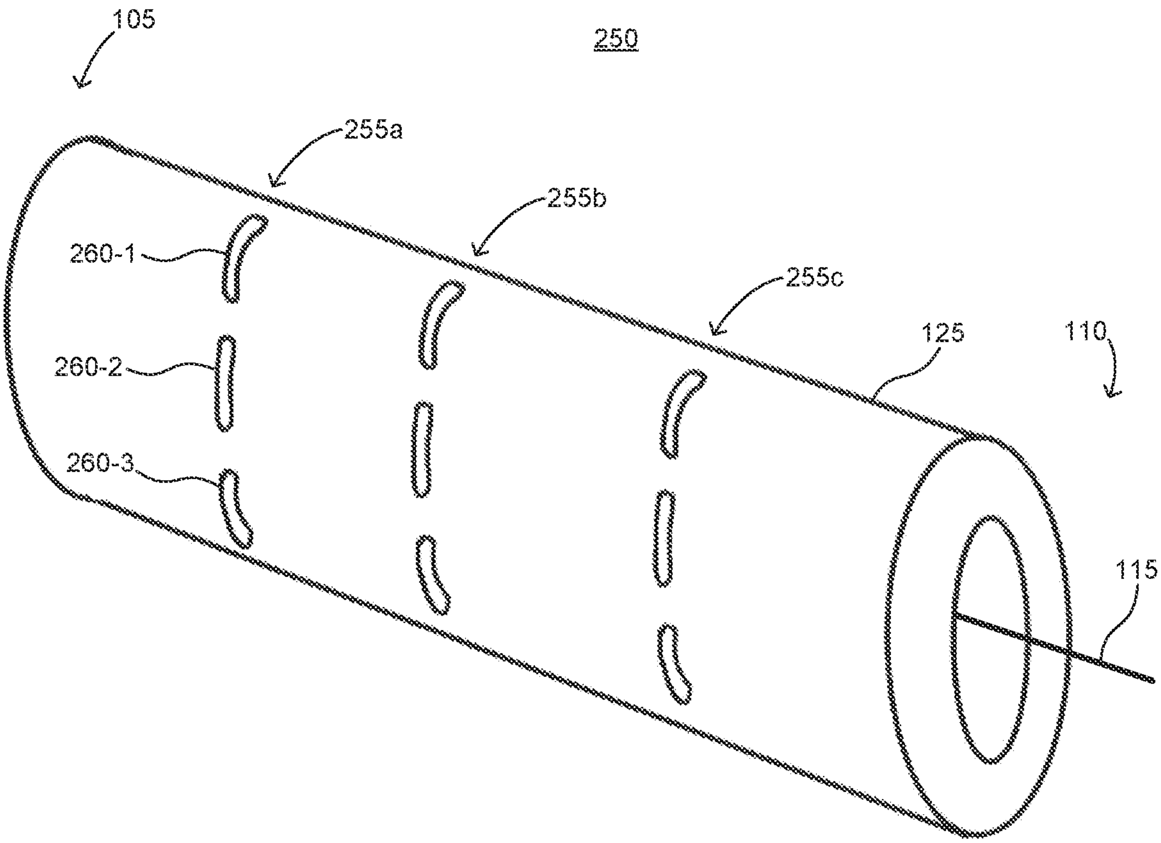
FIG. 2C is a perspective view of a cable grommet including dashed slit rings.

To illustrate the use of dashed slits in embodiments, FIG. 2C is provided. FIG. 2C is a perspective view of a cable grommet 250 including dashed slit rings 255*a*, 255*b*, and 255*c*. In the FIG. 2C example, the cable grommet 250 is the same as the cable grommet 100 of FIGS. 2A and 2B with the exception that the cable grommet 250 includes dashed slit rings 255*a*-255*c* (collectively dashed slit rings 255) instead of protrusion rings 210. As can be seen from FIG. 2C, the dashed slit rings 255 are each made up of circumferentially aligned spaced slits (e.g., dashed slits 260-1, 260-2, and 260-3) and each extend along the circumference of the outer surface 125. Moreover, the dashed slit rings 255 are evenly spaced along the longitudinal axis 115 and are used to indicate positions along the longitudinal axis 115.

Figure 3B:
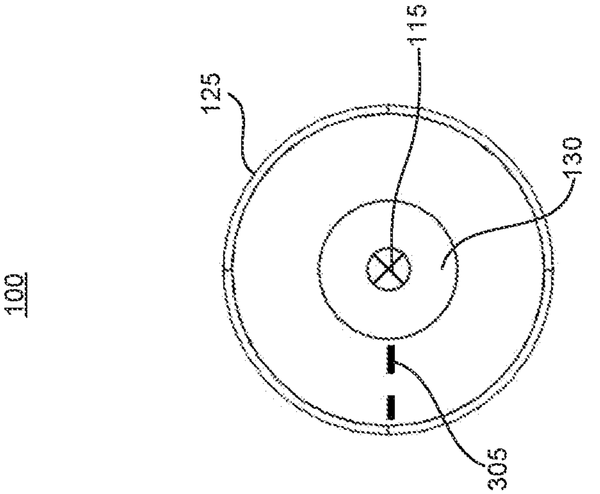
FIG. 3B is a profile view of the cable grommet of FIG. 3A, as seen from the second end of the cable grommet and showing the slit position.
Figure 3A:
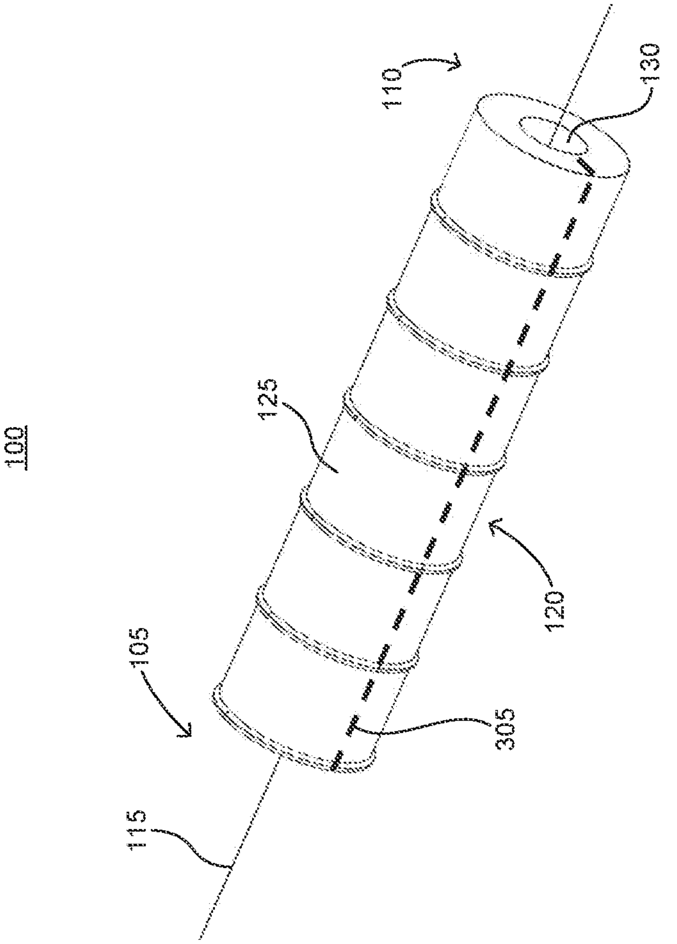
FIG. 3A is a perspective view of a cable grommet showing a slit position for a slit that may be formed in the cable grommet to allow for placing the cable grommet around a cable and tailoring the cable grommet to the cable.

Turning now to FIG. 3A, the figure is a perspective view of a cable grommet showing a slit position 305 for a slit that may be formed in the cable grommet. The slit is formed to allow for placing the cable grommet around a cable and to allow for tailoring the cable grommet to the cable. By way of example, the cable grommet shown in FIG. 3A is the cable grommet 100 of FIGS. 1A, 1B, 2A, and 2B, although the description of FIG. 3A is applicable to other embodiments. FIG. 3B is a profile view of the cable grommet 100 of FIG. 3A, as seen from the second end 110 of the cable grommet 100 and showing the slit position 305. As can be seen from FIGS. 3A and 3B, when a slit is made in the cable grommet 100 at the indicated slit position 305, the slit extends from the outer surface 125 of the body 120 to the bore 130, and from the first end 105 of the body 120 to the second end 110 of the body 120. As can be further seen from FIGS. 3A and 3B, when a slit is made in the cable grommet 100 at the indicated slit position 305, the slit may be parallel to the longitudinal axis 115, although it is noted that the slit need not be parallel to the longitudinal axis 115 in all embodiments.

The cable grommets according to FIGS. 1A-3B, may be considered configurable cable grommets. In some embodiments, a configurable cable grommet includes a slit, such as described in connection with FIG. 3A, and in some embodiments a configurable cable grommet does not include a slit. In embodiments in which a configurable cable grommet does not have a slit, a slit may be formed in the configurable cable grommet as part of a process of forming a configured cable grommet from the configurable cable grommet.

Figure 3C:
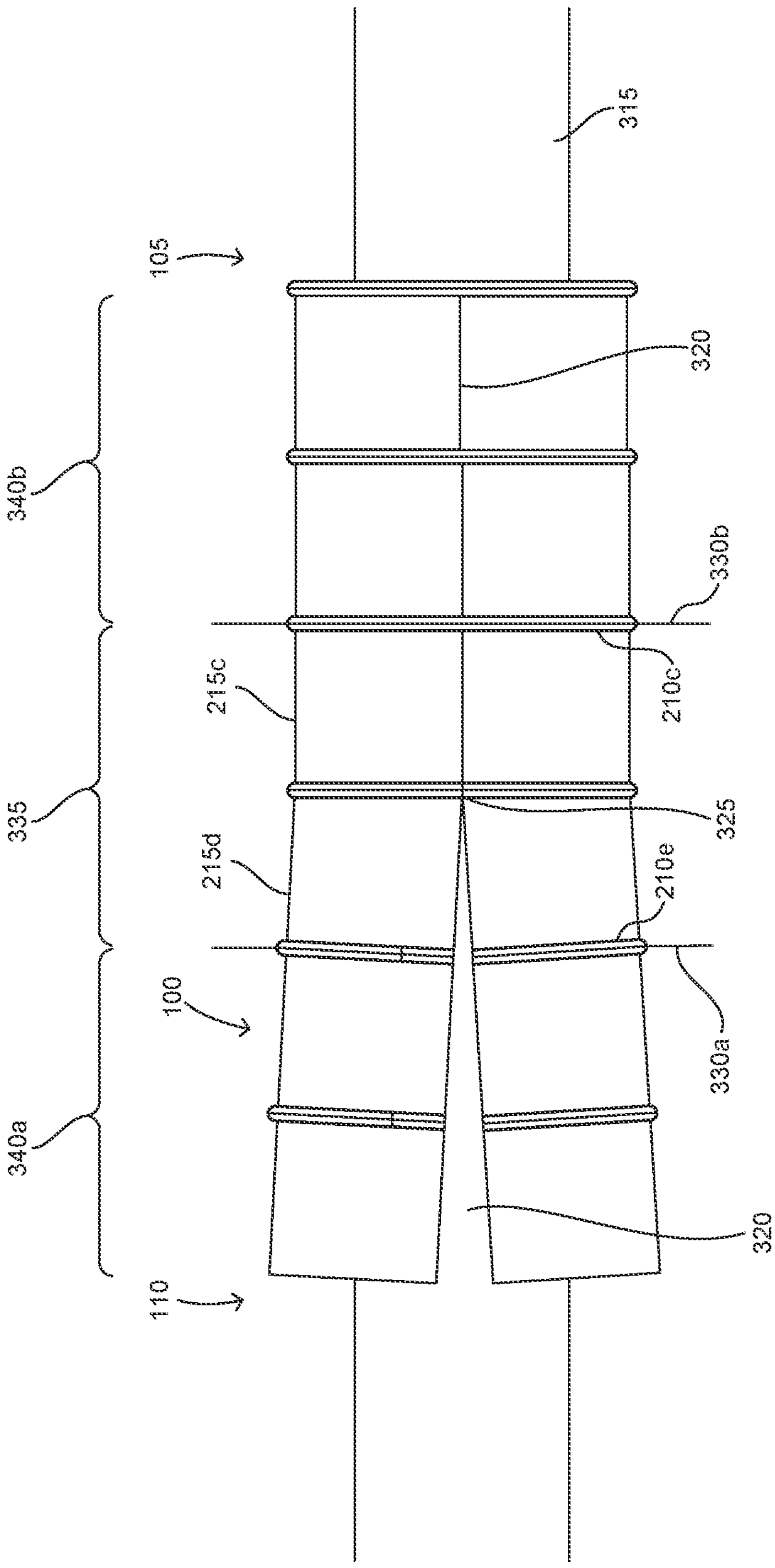
FIG. 3C is a plan view showing how a configurable cable grommet can be tailored to a cable.

FIG. 3C is a plan view showing how a configurable cable grommet can be configured for use with a cable 315. By way of example, the configurable cable grommet of FIG. 3C is the cable grommet 100 of FIGS. 3A and 3B, with a slit 320 provided at slit position 305, although it should be noted that the procedure described in connection with FIG. 3C may be used with configurable cable grommets other than the depicted configurable cable grommet. For example, the cable grommet shown in FIG. 3C may initially be provided without a slit, and a slit may be formed in the cable grommet as a first step of using the cable grommet with the cable 315, thereby yielding the cable grommet 100 with slit 320 as shown in FIG. 3C. In any event, to tailor the cable grommet 100 to the cable 315, the cable grommet is placed around the cable, either by threading the cable 315 through the first end 105 and second end 110 of the cable grommet 100, or by spreading the cable grommet 100 about the slit 320 and moving the cable grommet 100 around the cable 315 by way of the spread slit 320.

After the cable grommet 100 is placed around the cable 315, the slit 320 is gently closed, if necessary, until a portion of the slit 320 closes and no additional portion of the slit will close without applying undue manual force to the cable grommet 100. Thereby, the cable grommet 100 will be in a fitting position, with the slit 320 partially open and partially closed with a transition point 325 existing where the slit 320 transitions from an open slit disposition to a closed slit disposition. Next, the transition point 325 is noted, and based on the transition point 325 one or more separating positions are determined. The separating position(s) are one or more positions at which the cable grommet 100 will be separated to yield a configured cable grommet for the cable 315. In the FIG. 3C example, two separating positions are determined, a first separating position, represented by line 330*a*, and a second separating position, represented by line 330*b*. The cable grommet 100 is then separated at both separating positions 330*a* and 330*b*, each separation completely severing the cable grommet 100 along a direction perpendicular or substantially perpendicular to the longitudinal axis 115. In the FIG. 3C example, such separating yields a configured cable grommet 335, a first excess portion 340*a*, and a second excess portion 340*b*. The configured cable grommet 335 may be used to interface the cable 315 with a cable seal to prevent water or other elements from getting between the cable 315 and the cable seal.

It should be noted that while the configured cable grommet 335 of FIG. 3C includes cable grommet sections 215*c* and 215*d*, it is not necessary for a configured cable grommet formed by the process of FIG. 3C to correspond to demarcated cable sections. That is, the separating positions determined in the process of FIG. 3C need not coincide with positions of one or more of protrusion rings 210, and may be at one or more positions between the protrusion rings 210.

It should be further noted that the separating performed in the process of FIG. 3C may be performed by one or more of a wide range of separating techniques that will be apparent upon review of the present disclosure. For example, referring to FIG. 3C, the cable grommet 100 may be separated at separating positions 330*a* and 330*b* by cutting the cable grommet 100 at separating positions 330*a* and 330*b*. As another example, referring to FIG. 2C, the cable grommet 250 may be separated along dashed slit ring 255*a* by tearing the cable grommet 250 along dashed slit ring 255*a*.

Figure 3E:
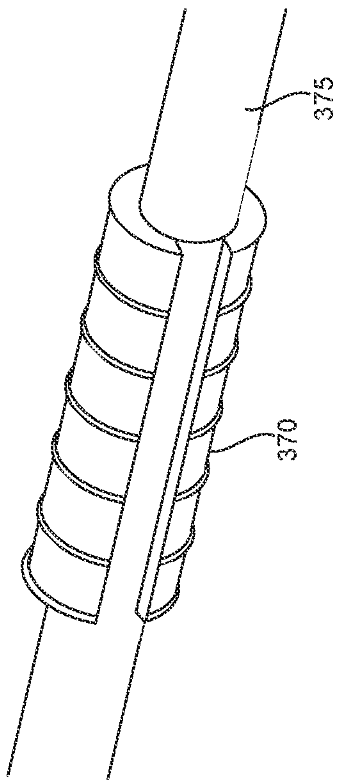
FIG. 3E is a plan view of a non-configurable cable grommet that is too small for a cable, and is provided for purposes of comparison to FIG. 3C.
Figure 3D:
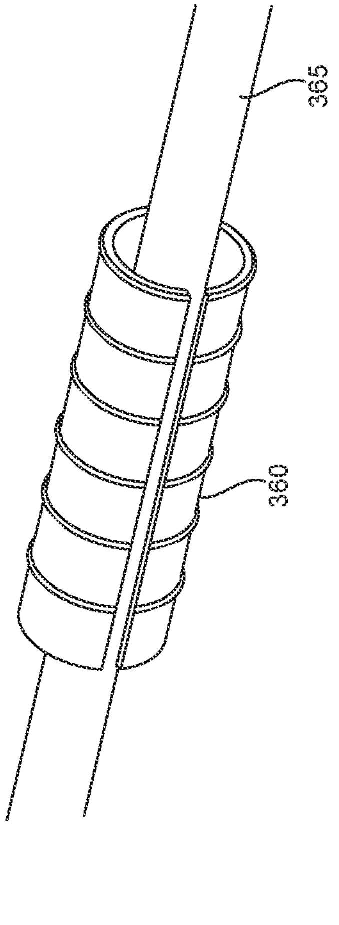
FIG. 3D is a plan view of a non-configurable cable grommet that is too large for a cable, and is provided for purposes of comparison to FIG. 3C.

The process described in connection with FIG. 3C allows a single configurable cable grommet to substitute for multiple non-configurable cable grommets. For instance, a field technician who may be called upon to service cables of varying sizes may carry a single configurable cable grommet that can be used for any of those sizes instead of carrying many non-configurable cable grommets in hopes that one of the non-configurable cable grommets is correctly sized for a given job. For purposes of comparison to the FIG. 3C scenario, FIGS. 3D and 3E are provided. FIG. 3D is a plan view showing a non-configurable cable grommet 360 that is too large for a cable 365. FIG. 3E is a plan view showing a non-configurable cable grommet 370 that is too small for a cable 375.

Figure 4:
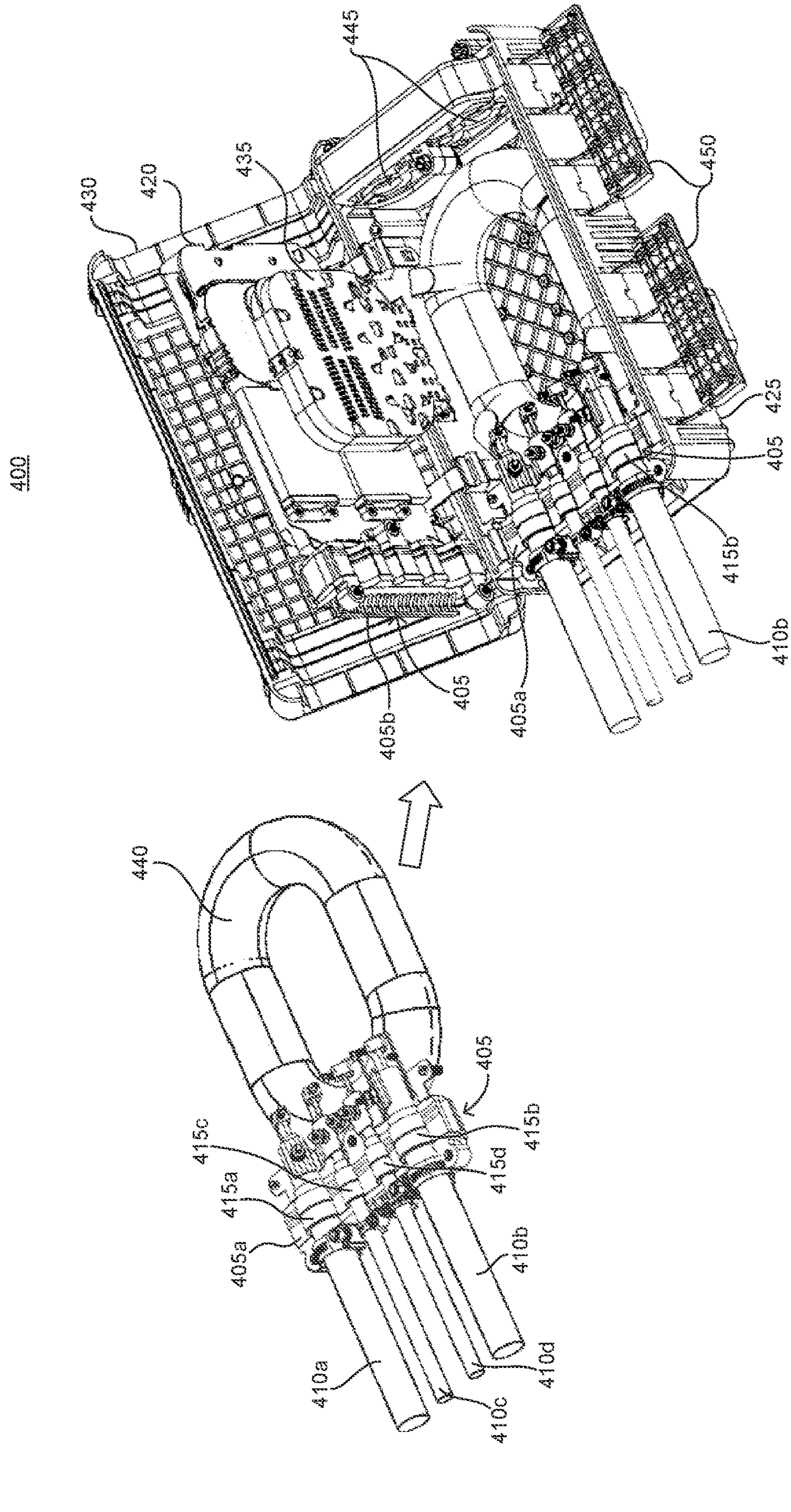
FIG. 4 is a perspective view of a multi-cable terminal that includes a cable seal in which cables are secured using cable grommets according to embodiments.

Referring now to FIG. 4, the figure shows a perspective view of a multi-cable terminal 400 that includes a cable seal 405. The cable seal 405 includes a first cable seal substructure 405*a* and a second cable seal substructure 405*b*, the first cable seal substructure 405*a* and the second cable seal substructure 405*b* being configured to mate against each other in a watertight fashion. In the first cable seal substructure 405*a*, cables 410*a*-410*d* are positioned, with the cables 410*a*-410*d* bearing respective cable grommets 415*a*-415*d* which are, in turn, respectively positioned between the cables 410*a*-410*d* and the first cable seal substructure 405*a*. The second cable seal substructure 405*b* is secured to a drop cable tray 420. Notably, the cable grommets 415*a*-415*d* may be configured according to the process described in connection with FIG. 3C.

Other elements shown in FIG. 4 include an enclosure base 425, an enclosure lid 430, splice trays 435, a buffer tube bundle 440, in-line cable openings 445, and clamping levers 450. The figure also depicts how the first cable seal substructure 405*a*, cables 410*a*-410*d*, cable grommets 415*a*-415*d*, and buffer tube bundle 440 may be positioned in the multi-cable terminal 400. By way of example, cable 410*a* may be an input feeder cable for the terminal 400, cable 410*b* may be an output feeder cable for the terminal 400, cable 410*c* may be first branch cable for the terminal 400, and cable 410*d* may be a second branch cable for the terminal 400.

The multi-cable terminal 400 of FIG. 4 may be sealed watertight. More specifically, to seal the multi-cable terminal 400 watertight, drop cable tray 420, which may have a hinged connection to the enclosure base 425, is positioned such that the second cable seal substructure 405*b* meets with the first cable seal substructure 405*a* and the cable grommets 415*a*-415*d*. Then, the enclosure lid 430 is positioned for clamping against the enclosure base 425 via the clamping levers 450. The closing force applied to the lid by the clamping levers 450 acts to urge the second cable seal substructure 405*b* against the first cable seal substructure 405*a* and the cable grommets 415*a*-415*d* via contact of the enclosure lid 430 with the drop cable tray 420 and/or second cable seal substructure 405*b*. In this manner, a watertight seal may be formed between the second cable seal substructure 405*b* and the first cable seal substructure 405*a*, between the second cable seal substructure 405*b* and the cable grommets 415*a*-415*d*, and between the first cable seal substructure 405*a* and the cable grommets 415*a*-415*d*.

Figure 5:
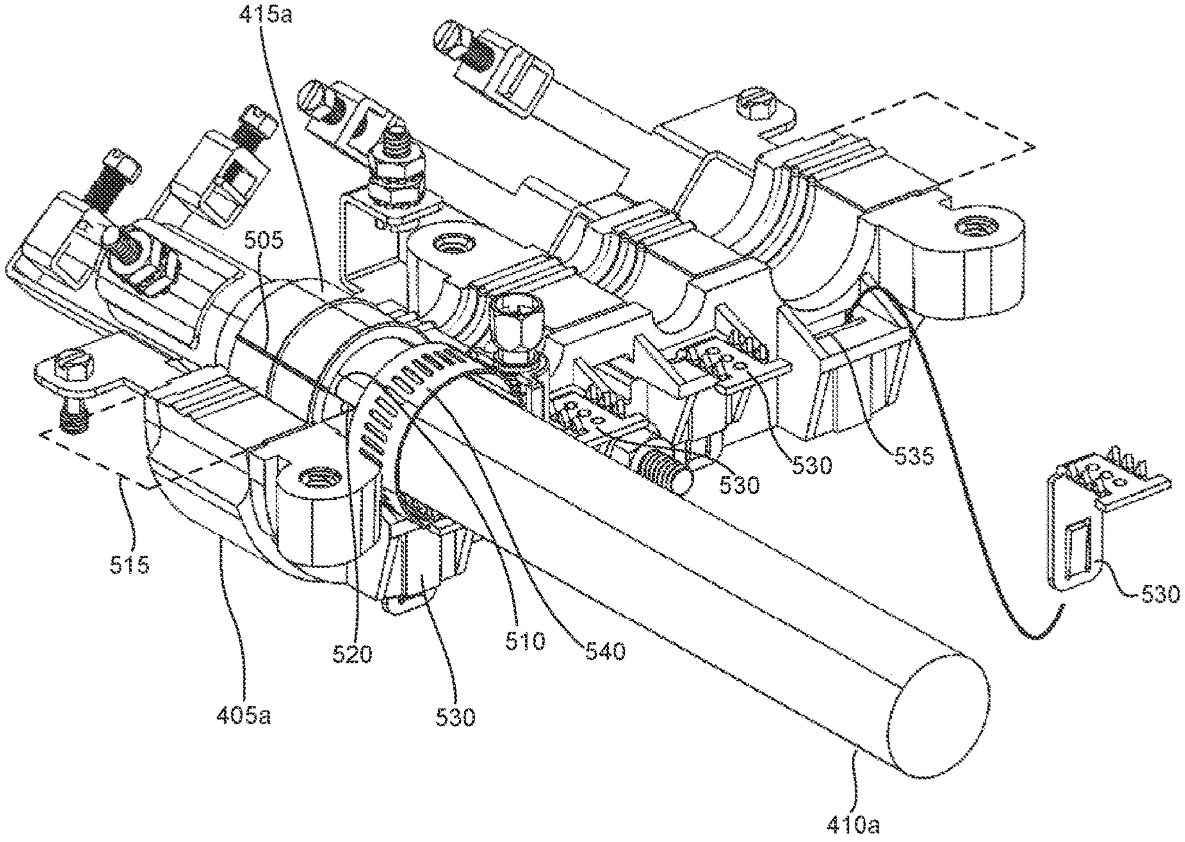
FIG. 5 is a perspective view of a portion of the arrangement of FIG. 4, including a substructure of the cable seal of FIG. 4.

Turning now to FIG. 5, the figure shows a perspective view of the first cable seal substructure of 405*a* of the cable seal 405 of FIG. 4 with the cable 410*a* and the cable grommet 415*a* positioned in the first cable seal substructure 405*a*. The cable grommet 415*a* may, for example, be configured according to the process described in connection with FIG. 3C and include a slit 505 parallel to the longitudinal axis of the cable grommet. In FIG. 5, the slit 505 is oriented so a plane 510 parallel to the slit, passing through the longitudinal axis, and extending to a mating plane 515 of the first cable seal substructure 405*a* forms an angle 520 of 45 degrees, or substantially 45 degrees, with the mating plane 515. Orienting the slit 505 such that the angle 520 is in the range of approximately 45 degrees to approximately 0 degrees advantageously aids closure of the slit 505 upon compression of the cable grommet by urging of the second cable seal substructure 405*b* against the first cable seal substructure 405*a*. Moreover, additional sealing advantage may be realized when the cable seal grommet 415*a* is oriented so that the end of the cable grommet 415*a* having a smaller bore size than the other end of the cable grommet 415*a* is proximate the inside of a multi-cable terminal in which the arrangement of FIG. 5 is employed (e.g., multi-cable terminal 400), with the other end of the cable grommet proximate the outside of the multi-cable terminal. For example, if the configured cable grommet 335 of FIG. 3C were used, grommet section 215*d* would be positioned proximate the inside of the multi-cable terminal, and grommet section 215*c* would be positioned proximate the outside of the multi-cable terminal.

Other elements shown in FIG. 5 include cable anchors 530. Each cable anchor 530 is movable in a direction perpendicular to the longitudinal axis of a cable (e.g., cable 410*a*) to be secured by the cable anchor 530. Thereby, the cable anchors 530 can accommodate different diameter cables while keeping the longitudinal axes of the cables at the same level. Also, with an L-shaped design and a catching structure on the vertical portion, the cable anchors 530 can be secured in vertical slots (e.g., vertical slot 535) after the cable anchors are secured to the cables (e.g., with a hose clamp 540).

Embodiments of the present technology include, but are not restricted to, the following.

(1) A cable grommet including a body having an outer surface, a first end, a second end, and a longitudinal axis extending between the first end and the second end; and a bore extending along the longitudinal axis of the body between the first end and the second end, wherein the outer surface of the body is cylindrical and has an outer surface diameter that is constant or substantially constant as the body is traversed from the first end to the second end, and wherein the bore has a bore diameter that tapers as the bore is traversed from the first end to the second end.

(2) The cable grommet according to (1), wherein the cable grommet includes a slit that extends from the outer surface of the body to the bore, and from the first end of the body to the second end of the body.

(3) The cable grommet according to (2), wherein the slit is parallel to the longitudinal axis.

(4) The cable grommet according to (1), wherein outer surface of the body includes markings indicating positions along the longitudinal axis.

(5) The cable grommet according to (1), wherein the outer surface of the body includes protrusions, indentations, or dashed slits indicating positions along the longitudinal axis.

(6) The cable grommet according to (1), wherein outer surface of the body includes markings indicating positions along the longitudinal axis, and at least one of protrusions, indentations, or dashed slits indicating positions along the longitudinal axis.

(7) A method for configuring a cable grommet for a cable including providing a configurable cable grommet, the configurable cable grommet comprising a body having an outer surface, a first end, a second end, and a longitudinal axis extending between the first end and the second end, a bore extending along the longitudinal axis of the body between the first end and the second end, and a slit that extends from the outer surface of the body to the bore, and from the first end of the body to the second end of the body, wherein the outer surface of the body is cylindrical and has an outer surface diameter that is constant or substantially constant as the body is traversed from the first end to the second end, and wherein the bore has a bore diameter that tapers as the bore is traversed from the first end to the second end; placing the configurable cable grommet around a cable; noting a transition point where the slit transitions from an open slit disposition to a closed slit disposition; determining one or more separating positions based on the transition point; and separating the configurable cable grommet at the one or more separating positions to form a configured cable grommet.

(8) The method according to (7), wherein the slit is parallel to the longitudinal axis.

(9) The method according to (7), wherein the step of providing the configurable cable grommet includes providing an un-slit configurable cable grommet including the body having an outer surface, the first end, the second end, and the longitudinal axis extending between the first end and the second end, the bore extending along the longitudinal axis of the body between the first end and the second end, wherein the outer surface of the body is cylindrical and has the outer surface diameter that is constant or substantially constant as the body is traversed from the first end to the second end, and wherein the bore has the bore diameter that tapers as the bore is traversed from the first end to the second end; and slitting the un-slit configurable cable grommet to form the slit that extends from the outer surface of the body to the bore, and from the first end of the body to the second end of the body.

(10) The method according to (9), wherein the slit is parallel to the longitudinal axis.

(11) The method according to (7), wherein outer surface of the body includes markings indicating positions along the longitudinal axis.

(12) The method according to (7), wherein the outer surface of the body includes protrusions, indentations, or dashed slits indicating positions along the longitudinal axis.

(13) The method according to (7), wherein outer surface of the body includes markings indicating positions along the longitudinal axis, and at least one of protrusions, indentations, or dashed slits indicating positions along the longitudinal axis.

(14) The method according to (7), further including placing the configured cable grommet around the cable.

(15) The method according to (15), wherein the slit is parallel to the longitudinal axis, and wherein the step of placing the configured cable grommet around the cable comprises placing the configured cable grommet around the cable such that when the cable and cable grommet are positioned in a cable seal the slit is oriented so a plane parallel to the slit, passing through the longitudinal axis, and extending to a mating plane of the cable seal forms an angle with the mating plane in the range of approximately 45 degrees to approximately 0 degrees angle.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A cable grommet comprising:

a body having an outer surface, a first end, a second end, and a longitudinal axis extending between the first end and the second end; and a bore extending along the longitudinal axis of the body between the first end and the second end, wherein the outer surface of the body is cylindrical and has an outer surface diameter that is constant or substantially constant as the body is traversed from the first end to the second end, and wherein the bore has a bore diameter that tapers as the bore is traversed from the first end to the second end, and wherein outer surface of the body includes markings indicating positions along the longitudinal axis.

2. The cable grommet according to claim 1, wherein the cable grommet includes a slit that extends from the outer surface of the body to the bore, and from the first end of the body to the second end of the body.

3. The cable grommet according to claim 2, wherein the slit is parallel to the longitudinal axis.

4. The cable grommet according to claim 1, wherein the outer surface of the body includes protrusions, indentations, or dashed slits indicating positions along the longitudinal axis.

5. A method for configuring a cable grommet for a cable comprising:

providing a configurable cable grommet, the configurable cable grommet comprising a body having an outer surface, a first end, a second end, and a longitudinal axis extending between the first end and the second end, a bore extending along the longitudinal axis of the body between the first end and the second end, and a slit that extends from the outer surface of the body to the bore, and from the first end of the body to the second end of the body, wherein the outer surface of the body is cylindrical and has an outer surface diameter that is constant or substantially constant as the body is traversed from the first end to the second end, and wherein the bore has a bore diameter that tapers as the bore is traversed from the first end to the second end;

placing the configurable cable grommet around a cable;

noting a transition point where the slit transitions from an open slit disposition to a closed slit disposition;

determining one or more separating positions based on the transition point; and separating the configurable cable grommet at the one or more separating positions to form a configured cable grommet.

6. The method according to claim 5, wherein the slit is parallel to the longitudinal axis.

7. The method according to claim 5, wherein the step of providing the configurable cable grommet comprises:

providing an un-slit configurable cable grommet comprising the body having the outer surface, the first end, the second end, and the longitudinal axis extending between the first end and the second end, the bore extending along the longitudinal axis of the body between the first end and the second end, wherein the outer surface of the body is cylindrical and has the outer surface diameter that is constant or substantially constant as the body is traversed from the first end to the second end, and wherein the bore has the bore diameter that tapers as the bore is traversed from the first end to the second end; and slitting the un-slit configurable cable grommet to form the slit that extends from the outer surface of the body to the bore, and from the first end of the body to the second end of the body.

8. The method according to claim 7, wherein the slit is parallel to the longitudinal axis.

9. The method according to claim 5, wherein outer surface of the body includes markings indicating positions along the longitudinal axis.

10. The method according to claim 5, wherein the outer surface of the body includes protrusions, indentations, or dashed slits indicating positions along the longitudinal axis.

11. The method according to claim 5, wherein outer surface of the body includes markings indicating positions along the longitudinal axis, and at least one of protrusions, indentations, or dashed slits indicating positions along the longitudinal axis.

12. The method according to claim 5, wherein the slit is parallel to the longitudinal axis, and the configured cable grommet is positioned around the cable such that when the cable and the configured cable grommet are positioned in a cable seal the slit is oriented so a plane parallel to the slit, passing through the longitudinal axis, and extending to a mating plane of the cable seal forms an angle with the mating plane in the range of approximately 45 degrees to approximately 0 degrees angle.

* * * * *